United States Patent
Allaire et al.

(10) Patent No.: US 7,685,840 B2
(45) Date of Patent: Mar. 30, 2010

(54) METHOD OF MINIMIZING DISTORTION IN A SHEET OF GLASS

(75) Inventors: Roger Alphee Allaire, Big Flats, NY (US); Darren Ryan Courtright, Elmira, NY (US); Clive Darrell Gierbolini, Painted Post, NY (US); Dean Veral Neubauer, Horseheads, NY (US); Casey Allen Volino, Tioga, PA (US)

(73) Assignee: Corning Incorporated, Corning, NY (US)

( * ) Notice: Subject to any disclaimer, the term of this patent is extended or adjusted under 35 U.S.C. 154(b) by 816 days.

(21) Appl. No.: 11/389,615

(22) Filed: Mar. 24, 2006

(65) Prior Publication Data

US 2007/0220920 A1   Sep. 27, 2007

(51) Int. Cl.
*C03B 11/08* (2006.01)
(52) U.S. Cl. .............. 65/29.12; 65/90; 65/91; 65/53; 65/118; 65/95; 428/64.1; 428/64.2; 428/64.4
(58) Field of Classification Search .............. None
See application file for complete search history.

(56) References Cited

U.S. PATENT DOCUMENTS 5,146,414 A * 9/1992 McKown et al. ............ 702/49
5,654,057 A * 8/1997 Kitayama et al. ........... 428/64.1
6,758,064 B1   7/2004 Kariya ......................... 65/91
6,897,956 B2   5/2005 Noguchi et al. ............. 356/401
2005/0120748 A1   6/2005 Xun et al. .................... 65/53
2005/0206898 A1   9/2005 Noguchi et al. ............. 356/400

FOREIGN PATENT DOCUMENTS

WO   WO2005/055284 A   6/2005

OTHER PUBLICATIONS

Walter M. Buehl et al., "Thermal Compaction Modeling of Corning Code-7059 Fusion Drawn Glass", Society for Information Display, International Symposium Digest of Technical Papers, vol. XXII, pp. 667-670. Anaheim Convention Center May 6-10, 1991.

* cited by examiner

*Primary Examiner*—Philip C Tucker
*Assistant Examiner*—Phu H Nguyen
(74) *Attorney, Agent, or Firm*—Kevin M. Able

(57) ABSTRACT

A method of minimizing distortion in a glass sheet manufacturing process wherein the stress in a parent sheet of glass is measured along each edge of the sheet. The stress data is then used to develop a distortion predictor for predicting the in-plane distortion which sub-sheets of the parent sheet are likely to exhibit when the parent sheet is cut into pre-determined sizes. The in-plane distortion may be predicted based on criteria established by the glass manufacturer, or supplied by an original equipment manufacturer (OEM).

4 Claims, 3 Drawing Sheets

METHOD OF MINIMIZING DISTORTION IN A SHEET OF GLASS

BACKGROUND OF THE INVENTION

1. Field of the Invention

The present invention relates generally to glass substrates, and particularly to a glass substrate product for use in passive or active display manufacturing processes.

2. Technical Background

Liquid crystal displays (LCDs) are non-emissive displays that use external light sources. An LCD is a device that may be configured to modulate an incident polarized light beam emitted from the external source. LC material within the LCD modulates light by optically rotating the incident polarized light. The degree of rotation corresponds to the mechanical orientation of individual LC molecules within the LC material. The mechanical orientation of the LC material is readily controlled by the application of an external electric field. This phenomenon is readily understood by considering a typical twisted nematic (TN) liquid crystal cell.

A typical TN liquid crystal cell includes two substrates and a layer of liquid crystal material disposed there between. Polarization films, oriented 90° one to the other, are disposed on the outer surfaces of the substrates. When the incident polarized light passes through the polarization film, it becomes linearly polarized in a first direction (e.g., horizontal, or vertical). With no electric field applied, the LC molecules form a 90° spiral. When incident linearly polarized light traverses the liquid crystal cell it is rotated 90° by the liquid crystal material and is polarized in a second direction (e.g., vertical, or horizontal). Because the polarization of the light was rotated by the spiral to match the polarization of the second film, the second polarization film allows the light to pass through. When an electric field is applied across the liquid crystal layer, the alignment of the LC molecules is disrupted and incident polarized light is not rotated. Accordingly, the light is blocked by the second polarization film. The above described liquid crystal cell functions as a light valve. The valve is controlled by the application of an electric field. Those of ordinary skill in the art will also understand that, depending on the nature of the applied electric field, the LC cell may also be operated as a variable light attenuator.

An Active Matrix LCD (AMLCD) typically includes several million of the aforementioned LC cells in a matrix. Referring back to the construction of an AMLCD, one of the substrates includes a color filter plate and the opposing substrate is known as the active plate. The active plate includes the active thin film transistors (TFTs) that are used to control the application of the electric field for each cell or subpixel. The thin-film transistors are manufactured using typical semiconductor type processes such as sputtering, CVD, photolithography, and etching. The color filter plate includes a series of red, blue, and green organic dyes disposed thereon which ideally corresponds precisely with the subpixel electrode area of the opposing active plate. Thus, each sub-pixel on the color plate should be aligned with a transistor controlled electrode disposed on the active plate, since each sub-pixel must be individually controllable. One way of addressing and controlling each sub pixel is by disposing a thin film transistor at each sub pixel.

The properties of the aforementioned substrate glass are extremely important. The physical dimensions of the glass substrates used in the production of AMLCD devices must be tightly controlled. The fusion process, described in U.S. Pat. No. 3,338,696 (Dockerty) and U.S. Pat. No. 3,682,609 (Dockerty), is one of the few processes capable of delivering substrate glass without requiring costly post-substrate forming finishing operations, such as lapping, grinding, and polishing. Further, because the active plate is manufactured using the aforementioned semiconductor type processes, the substrate must be both thermally and chemically stable. Thermal stability, also known as thermal compaction or shrinkage, is dependent upon both the inherent viscous nature of a particular glass composition (as indicated by its strain point) and the thermal history of the glass sheet, which is a function of the manufacturing process. Chemical stability implies a resistance to the various etchant solutions used in the TFT manufacturing process.

There is a demand for ever larger display sizes. This demand, and the benefits derived from economies of scale, are driving AMLCD manufacturers to process larger sized substrates. When assembled, components on each side of the two substrates, or sub-sheets, used to form the display must align precisely during assembly. Pixel misalignment by as little as 2% is visually detectable, and therefore unacceptable.

Unfortunately, stresses which may be frozen into the glass sheets during manufacture of the parent sheet may result in distortion of the sub-sheets after the parent glass sheet is cut. This distortion is exacerbated as the size of the sheet is increased. However, such future distortion is not easily discerned in the parent glass as manufactured by the glass manufacturer.

What is needed is a method of equating stresses within the parent sheet of glass to distortion which may be exhibited by an individual sub-sheet sheet when the parent sheet is cut.

SUMMARY

Embodiments of the present invention are directed toward a method of reducing the distortion of a glass sheet.

The invention will be understood more easily and other objects, characteristics, details and advantages thereof will become more clearly apparent in the course of the following explanatory description, which is given, without in any way implying a limitation, with reference to the attached Figures. It is intended that all such additional systems, methods features and advantages be included within this description, be within the scope of the present invention, and be protected by the accompanying claims.

In one embodiment of the present invention a method for reducing distortion in a sheet of glass is described comprising forming a glass sheet in a glass sheet manufacturing process, obtaining a plurality of stress data for the glass sheet, determining a predicted distortion for the glass sheet from the stress data; and modifying the glass sheet manufacturing process in response to the predicted distortion.

In another embodiment of the present invention a method for reducing distortion in a sheet of glass is described comprising forming a glass sheet in a glass manufacturing process, the glass sheet comprising a plurality of edge segments, obtaining a plurality of stress data for the glass sheet, cutting the glass sheet into sub-sheets, determining a representative distortion for each sub-sheet, determining a distortion representative of the plurality of sub-sheets from the representative distortion for each sub-sheet, correlating the stress data to the distortion representing the plurality of sub-sheets, using the correlation to predict distortion in a subsequent glass sheet formed from the glass manufacturing process; and modifying the glass manufacturing process in response to the predicted distortion In still another embodiment, a method for reducing distortion in a sheet of glass is described comprising forming a glass sheet in a glass manufacturing process, the glass sheet being substantially planar and comprising a plurality of edge segments, measuring a stress along each of the edge segments, cutting the glass sheet into sub-sheets, measuring a maximum distortion for each sub-sheet, selecting the largest maximum distortion from the measured maximum distortions, correlating the measured edge stress data to largest maximum distortion, and using the correlation to modify the glass manufacturing process.

In yet another embodiment of the present invention, a method of minimizing distortion in a sheet of glass comprising, forming a glass sheet in a glass sheet manufacturing process, the glass sheet being substantially planar and comprising a plurality of edge segments, measuring a stress along each of the edge segments, cutting the glass sheet into sub-sheets, determining a maximum distortion for each sub-sheet, selecting the largest of the maximum distortions, correlating the measured edge stress data to the largest of the maximum distortions, measuring the edge stress in a subsequent glass sheet drawn in the downdraw glass manufacturing process, predicting the maximum distortion in the subsequent glass sheet and modifying the glass manufacturing process in response to the predicted maximum distortion.

Additional features and advantages of the invention are set forth in the detailed description which follows, and in part will be readily apparent to those skilled in the art from that description or recognized by practicing the invention as described herein. The accompanying exemplary drawings are included to provide a further understanding of the invention, and are incorporated in and constitute a part of this specification.

DETAILED DESCRIPTION

Figure 1:
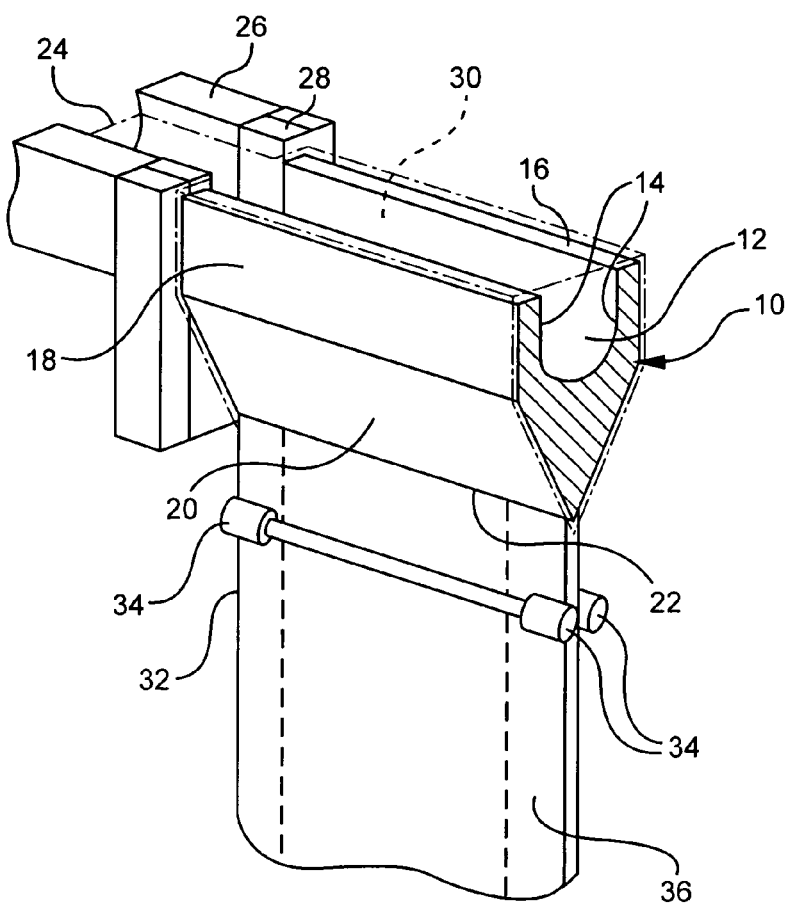
FIG. 1 is a perspective view of a fusion downdraw glass making apparatus.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

As used herein, a downdraw glass sheet manufacturing process refers to any form of glass sheet manufacturing processes in which glass sheets are formed while viscous glass is drawn in a downward direction. Particularly, in a fusion downdraw glass forming process, molten glass flows into a trough, then overflows and runs down both sides of a pipe or forming wedge, more commonly referred to as an isopipe. The two flows fuse together at what is known as the root (where the pipe ends and the two overflow portions of glass rejoin), and the combined flow is drawn downward until cool.

The fusion overflow glass sheet manufacturing process can be described with the help of an embodiment illustrated in FIG. 1, wherein forming wedge (isopipe) 10 includes an upwardly open channel 12 bounded on its longitudinal sides by wall portions 14, which terminate at their upper extent in opposed longitudinally-extending overflow lips or weirs 16. The weirs 16 communicate with opposed outer sheet forming surfaces of forming wedge 10. As shown, forming wedge 10 is provided with a pair of substantially vertical forming surface portions 18 which communicate with weirs 16, and a pair of downwardly inclined and converging surface portions 20 which terminate at a substantially horizontal lower apex or root 22 forming a straight, glass draw line.

Molten glass 24 is fed into channel 12 by means of delivery passage 26 communicating with channel 12. The feed into channel 12 may be single ended or, if desired, double ended. A pair of restricting dams 28 are provided above overflow weirs 16 adjacent each end of channel 12 to direct the overflow of the free surface 30 of molten glass 24 over overflow weirs 16 as separate streams, and down opposed forming surface portions 18, 20 to root 22 where the separate streams, shown in chain lines, converge to form a sheet, or ribbon, of virgin-surfaced glass 32.

In the fusion process, a pulling device in the form of pulling rolls or rollers 34 are placed downstream of forming wedge root 22 and are used to adjust the rate at which the formed ribbon of glass leaves the converging forming surfaces at the root and thus help determine the nominal thickness of the finished sheet. The pulling rolls are typically designed to contact the glass ribbon at its outer edges portions 36 only, leaving the interior, quality region of the glass ribbon untouched. The ribbon is thereafter cut into individual glass sheets and edge portions 36 which have been contacted by the pulling rolls are discarded from the sheet, leaving only quality surfaces.

One advantage to the fusion glass forming process described above is that the ribbon can be formed without the glass ribbon quality surfaces contacting the forming apparatus surfaces, such as the pulling rolls, while the viscosity of the glass is low enough to sustain plastic deformation or damage. This provides for smooth, contaminant-free glass surfaces. In addition, this technique is capable of forming very flat and thin glass sheets to very high tolerances. However, other glass sheet forming techniques may also benefit from the present invention, including, but not limited to, single-sided overflow downdraw, slot draw, updraw and float forming techniques.

The stresses which may be present in a formed article of glass are highly dependent upon the manufacturing process used, and the thermal history of the glass. This is just as true for glass sheet as for other glass articles. Many times the stresses which may be frozen into the finished glass sheet are the result of thermal gradients experienced by the glass ribbon from which the sheet is cut as the glass of the ribbon transitions from a viscous liquid to a glassy solid state. They may also enter the glass through mechanical deformation of the glass during this transition. Regardless the source, these stresses are distributed within the finished sheet, by manufacturing design, such that the finished sheet as provided to the OEM is substantially planar with substantially parallel opposing edges. This is due in large part to the care taken by the manufacturer during the manufacturing process, as every attempt is generally made to either eliminate stress within the sheet, or to create counterbalancing stresses within the sheet to mitigate sources of stress which are known, but not easily eliminated. Thus, the substantially planar sheet of glass produced by the glass manufacturer exhibits minimal distortion. However, this may change when the glass sheet is further processed, for example, by a display manufacturer or other OEM. As described previously, the OEM is faced with the task of first depositing electrical components for a display device on glass substrates, and then aligning two (or more) substrates, such that the components on one substrate align precisely with the components on the other substrate(s). Once optimally aligned, the substrates may be sealed to form a display device.

An OEM manufacturing process may often require that large glass sheets purchased from the glass manufacturer be cut into sections, or sub-sheets, for optimum material utilization or handling ability. These sub-sheets can serve as display device substrates. The size of the sub-sheets depends, inter alia, on the particular type of display being manufactured. However, generally the sub-sheets are rectangular, with parallel opposing edges. It is when the parent glass sheet is cut into sub-sheets that stress-related distortion may impact the OEM manufacturing process. Cutting the glass sheet may result in a redistribution of stress such that the stresses in the sub-sheets reach a new equilibrium. This equilibrium is generally reached by a shape change—distortion—of the sub-sheets.

Distortion of the sub-sheets cut from a parent glass sheet may be three-dimensional. That is, the sheet may exhibit both warping transverse to the plane of the parent sheet, and planar distortion. During processing however, OEMs typically flatten the glass sub-sheets, such as by using a vacuum platen. Thus, distortion experienced by the OEM is artificially constrained to in-plane distortion. Once a sheet of glass is cut, the in-plane shape of the sheet may change, e.g. opposing edges of the sub-sheets may no longer be parallel. In order for the glass manufacturer to predict distortion in cut sub-sheets, it is therefore desirable that OEM processes be mimicked as much as possible by conducting distortion measurements on glass sheets which have been similarly constrained.

Recalling that an offset of only 2% between corresponding components on substrates to be joined (sealed) is a problem, and that such individual components can be on the scale of micrometers in size, it can be easily seen that even minute distortion can be troublesome to a display OEM. The present invention provides a methodology for minimizing distortion in post-forming processes by predicting in-plane distortion in a sheet of glass, and feeding the resultant information back into the glass manufacturing process to reduce, minimize, or eliminate the predicted distortion, and therefore also the actual sub-sheet distortion experienced in downstream, post-forming processing such as those performed by OEMs.

As suggested previously, glass manufacturers form glass sheets for display applications to be flat, and preferably with parallel opposing edges. However, the dimensional tolerances within the glass manufacturing process per se do not typically extend into the micron range. Moreover, as the distortion phenomenon which is the subject of the present invention can be measured only after the parent glass sheet is cut, the detection process itself is destructive, and obviates the OEMs desire for receiving large sheets of glass. To wit, direct detection of distortion which may occur at a future date only after the parent glass sheet has been cut is not possible at the glass manufacturing stage. However, stresses within the glass can be more easily measured, and particularly those stresses at the edges of the glass sheet. And these stresses may be used to predict distortion in sub-sheets cut from the parent glass sheet.

Figure 2:
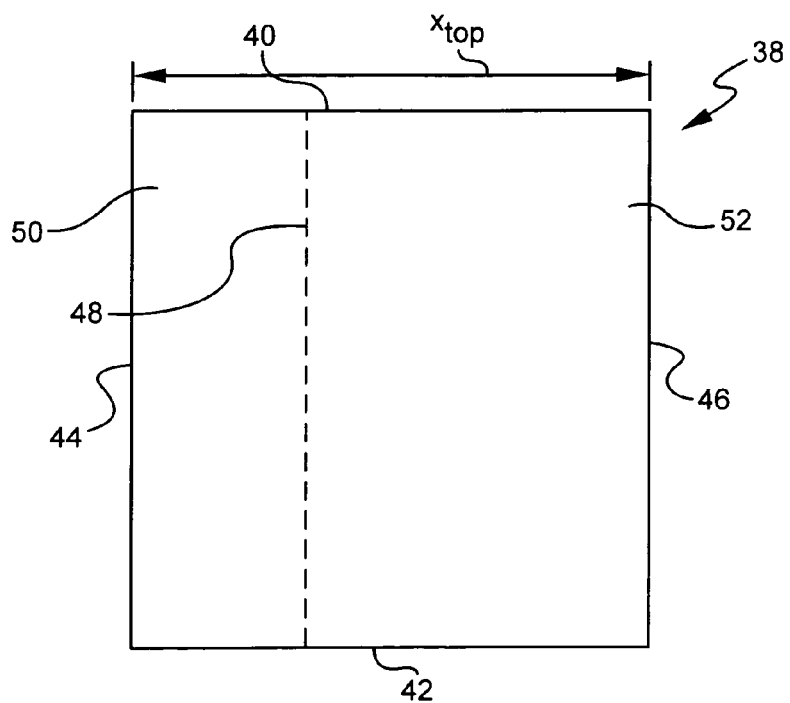
FIG. 2 is a top view of a sheet of glass indicated a line along which the glass sheet may be cut into a several sub-sheets in accordance with an embodiment of the present invention.

An exemplary parent glass sheet 38 for the manufacture of a display device is shown in FIG. 2. Also shown is each edge segment of sheet 38: top edge segment 40; bottom edge segment 42, first side edge segment 44, and; second side edge segment 46. A cut line 48 is depicted and represents a location where an OEM might cut parent sheet 38 into manageable sizes, e.g. therefore forming two sub-sheets 50, 52. Of course, the OEM may divide the sheet in a variety of different ways, producing any number of sub-sheets depending upon the application, and the division of parent glass sheet 38 into a minimal two sub-sheets is merely for purposes of illustration.

Figure 3:
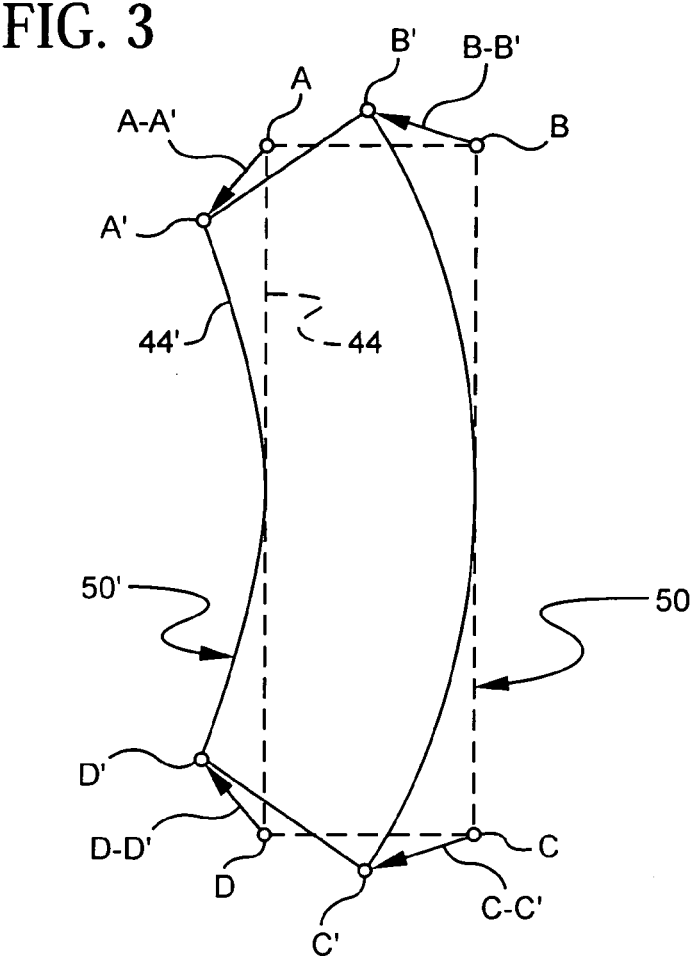
FIG. 3 is a top view of a sub-sheet of FIG. 2 which is distorted by the stress relaxation after cutting, overlaid on an outline of the same sub-sheet had there been no distortion.

FIG. 3 shows a sub-sheet, formed after cutting parent glass sheet 38, overlaid on the outline of the sub-sheet as if there had been no distortion. In FIG. 3, the undistorted outline of sub-sheet 50 is indicated by a dashed line, and reference numeral 50, in keeping with the designation shown in FIG. 2, and the actual, distorted sub-sheet after the cutting is denoted by a solid line and reference numeral 50'. As depicted, sub-sheet 50' exhibits at least an in-plane curvature (exaggerated in the figure) after being cut from parent glass sheet 38. Of course, sub-sheet 50' could have assumed a variety of different shapes, such as barrel distortion for example. However, the curved, in-plane distortion shown in FIG. 3 will be used to describe the present invention, without limitation to the actual shape a sub-sheet may assume after being cut from the parent sheet.

As one might expect, aligning display components on two sub-sheets which exhibit distortion may prove problematic, particularly if the shapes of the two sub-sheets are different. The distortion exhibited by sub-sheet 50' may be represented, for example, by the distance between a pre-determined point on sub-sheet 50, and the corresponding actual position of that point on cut sub-sheet 50' due to distortion in the cut sub-sheet. For the sake of illustration, one might select one or more corner points of the sub-sheet, and measure the distance from where the corner points should be (or are desired to be) after cutting to where the corners actually are after cutting. Thus, in one embodiment, distortion in sub-sheet 50' may be represented by the vector distance (or offset) between points A and A', B and B', C and C' and D and D'. This offset represents distortion. Of course, repositioning the cut sub-sheet in precisely the same position it occupied when it was a part of the parent glass sheet would be difficult enough if no distortion was present. In the case where the sub-sheet distorts due to the cutting, it is desirable to place the sub-sheet in a position after cutting which minimizes the offset so that an accurate reflection of the distortion can be obtained.

Figure 4:
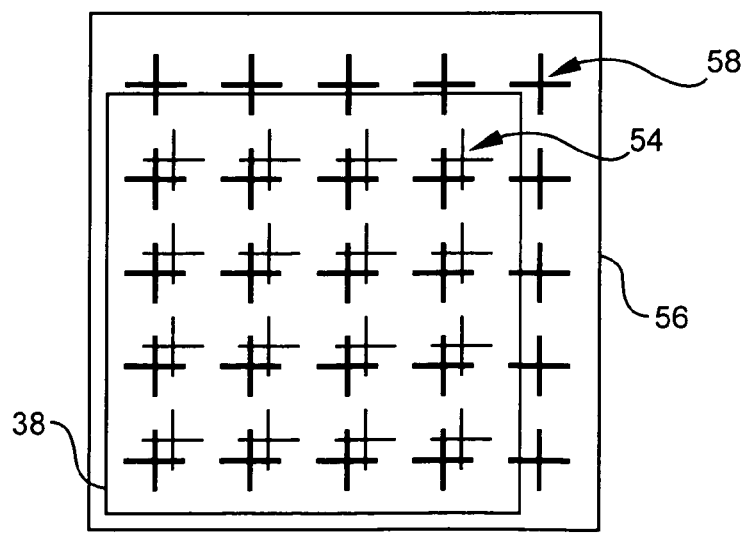
FIG. 4 is a top view of a measurement table having fiduciary marks, and a glass sheet having corresponding fiduciary marks resting on the measurement table.
Figure 5:
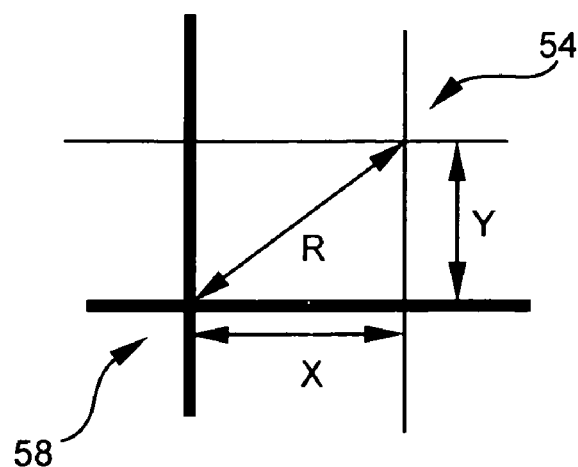
FIG. 5 illustrates a method of representing the offset between the table and sheet fiduciary marks of FIG. 4.
Figure 6:
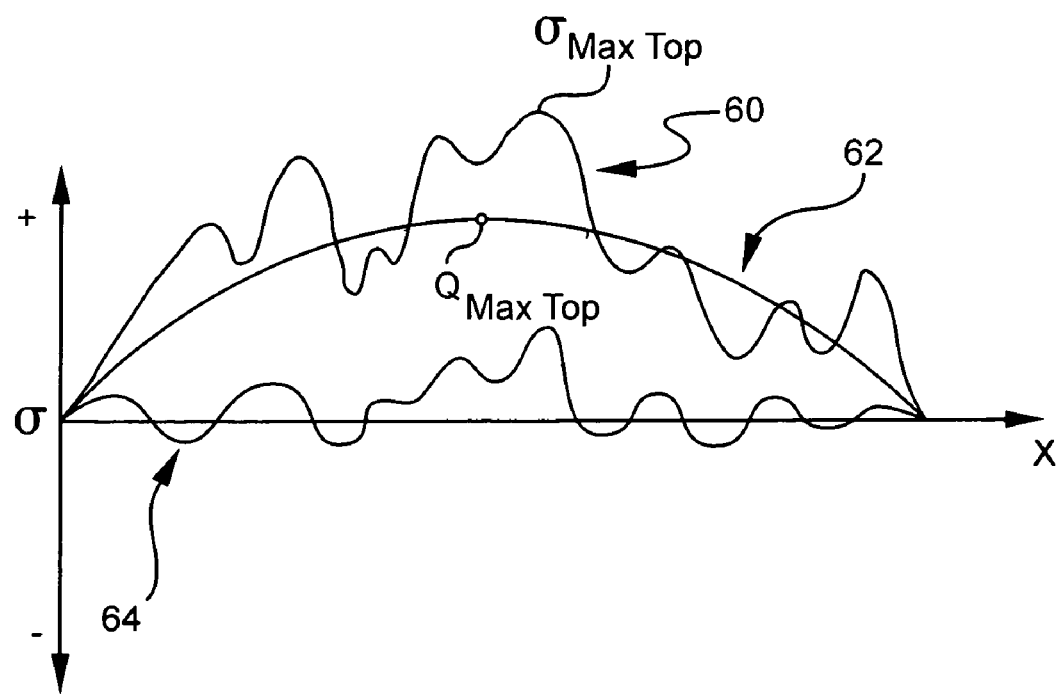
FIG. 6 is a plot illustrating measured stress (stress distribution) along the top edge segment of the glass sheet of FIG. 2, and a quadratic curve fitted to the stress distribution.

In one embodiment of the invention a parent sheet 38 marked with indicia in the form of fiduciary marks 54 (such as an array of x's) may be positioned on a planar measurement table 56 having corresponding fiduciary marks 58 such that the fiduciary marks 54 of parent glass sheet 38 are offset (linearly translated) from the table fiduciary marks 58, as is shown in FIG. 4. It is desirable that measurement table 56 have similar thermal expansion properties to glass sheet 38 being measured. Parent glass sheet 38 is positioned on the table such that the parent glass sheet fiduciary marks 54 are offset slightly in the x and y directions from the measurement table fiduciary marks 58. The parent glass sheet and the measurement table are then imaged with a high resolution imaging system (not shown) and the image (or images) analyzed to quantify the X and Y offsets, e.g. the line spacing in the example shown in FIG. 6 represented by a distance in the x-direction and a distance in the y-direction and R represents the direct distance between the two fiduciary marks. Next, parent glass sheet 38 is cut, producing a plurality of sub-sheets. Each sub-sheet is replaced on the table, re-imaged and the offset between table and sub-sheet fiduciary marks mathematically minimized. Also, as previously described, it is desirable to constrain the distortion exhibited by the sub-sheet to an in-plane distortion by flattening the sub-sheet. Again, this may be easily accomplished, for example, if the measurement table is in the form of a vacuum platen. Since the sub-sheet is constrained to be substantially planar, the offset of each fiduciary mark on the sub-sheet from the table fiduciary marks can be broken down into simple translational and rotational components and a conventional coordinate system transformation used to minimize the offset. Such computational minimization may be accomplished with the assistance of a computer. Simple spreadsheet computations may suffice. Of course other methods of marking and measuring position and positional changes as are known in the art may be used as well.

Distortion of sub-sheet 50' may be further represented by selecting, calculating or otherwise determining a representative distortion for the sub-sheet. For example, the largest of the measured offsets between the aforementioned points may be selected as a representative distortion. Thus, for example, in a sub-sheet wherein the A-A' displacement is 0.1 µm, the B-B' displacement is 0.25 µm, the C-C' displacement is 0.15 µm and the D-D' displacement is 0.075 µm, the sub-sheet may be said to exhibit 0.25 µm of in-plane distortion, corresponding to the largest displacement—between B and B'. It should be noted that individual OEMs may apply their own definition of distortion, and this should be accounted for during development of a predicted distortion model. That is, the method just described involving distortion relative to the corners of the sub-sheet, and selecting the maximum, is but one method of defining distortion according to the present embodiment. One could just as easily define the distortion as the displacement of the sub-sheet centroid, or the displacement of any other point or series of points on the sub-sheet. For example, OEMs may deposit components from multiple display devices on a sub-sheet, and the definition of distortion applied by the OEM may take this into account by applying a more refined definition, such as one having greater distortion resolution. This might occur by simply increasing the number of point-to-point paired offset distances computed. The distortion may also be represented not by selecting a maximum of measured distortion, but by calculating a distortion value from the individual measured distortions. For example, the representatitve distortion of the sub-sheet may be the average of the individual measured distortions. The appropriate distortion representation for the sub-sheets depends largely on the needs of an individual OEM.

To align substrates (e.g. sub-sheets) with opposing, and corresponding display components for one or more display devices, OEMs typically employ an optimization routine, such as described above, to minimize the component offset when substrates are joined. Such optimization routines are generally proprietary to a particular OEM.

Based on the description supra, one can easily see how the allowable distortion in a glass sub-sheet sheet becomes an important consideration in the parent glass sheet manufacturing process. It should be equally clear that direct measurement of the future distortion of a glass panel cut by an OEM poses a fundamental dilemma to the glass manufacturer.

In accordance with an embodiment of the present invention, stress is measured across each edge segment of parent glass sheet 38. The stress data derived from the stress measurement is then analyzed in a manner consistent with the following description and the aid of FIG. 6. By "consistent with" what is meant is that the analysis itself may be conducted computationally by a computing device (e.g. desktop computer, etc.), but is described and illustrated graphically herein for the purpose of providing a greater understanding of the method.

FIG. 6 shows an exemplary distribution (stress curve) 60 of stress along top edge segment 40 (stress as a function of distance x along the edge) of glass sheet 38. Note that the stress at the ends of each edge segment is zero, and corresponds to the corners of glass sheet 38. Although FIG. 6 shows an all tensile (positive) stress distribution, the stress may be compressive (negative), tensile, or both. Regardless whether the stress is compressive, tensile, or both, a maximum absolute value of the stress $\sigma_{max_{top}}$ is identified on curve 60. A quadratic curve 62 is then fitted to the stress data of curve 60. Note that quadratic curve 62 passes through zero stress at both ends of edge segment 40. The maximum absolute value $\sigma_{max_{top}}$ of quadratic curve 62 is then determined. Next, quadratic curve 62 is subtracted from stress curve 60, with the resultant "wavy" or difference curve 64 representing a variation component of the original edge stress curve 60. The absolute value of the amplitude range of the difference curve, $A_{R_{top}}$, is next determined. Finally, difference curve 64 is deconvolved into its constituent Fourier amplitude and harmonic terms of the form $$F(x) = \mu + \sum_{i=1}^{k} a_i \cos\left(2\pi \int_i x + \phi_i\right) \quad (1)$$

where F(x) would yield an approximation to the difference curve data at every position x;

µ is the average of the difference curve data;

$a_i$ is the amplitude of the $i^{th}$ Fourier frequency (i=1 to k);

k is the number of desired terms;

x is the position along the edge segment for each difference curve point;

and $\phi_i$ is the $i^{th}$ phase shift. Typically, the first four amplitude terms, $a_{1_{top}}$ through $a_{4_{top}}$, are selected (and k=4). While more than four terms may be used, this has been found to not to significantly affect the outcome.

Similar computations are made for bottom edge segment 42 as were made for top edge segment 40, resulting in an additional bottom stress curve absolute maximum $\sigma_{max_{bottom}}$, bottom quadratic absolute maximum, $Q_{max_{bottom}}$, difference curve absolute amplitude range $A_{R_{bottom}}$, and amplitude terms $a_{1_{bottom}}$ through $a_{4_{bottom}}$. Bottom components are not shown in FIG. 4. Additionally, the largest of $Q_{max_{top}}$ and $Q_{max_{bottom}}$ is determined, $Q_{max}$, as well as the average, $Q_{ave}$.

A stress distribution is also measured for the first and second side edges 44, 46, resulting in similar stress curves (stress distributions) for the side edges as were measured for the top and bottom edges. For the side edges, however, only an absolute maximum stress value $\sigma_{max\ 1}$, $\sigma_{max\ 2}$ is determined for each of the first and second side stress distributions, respectively.

The stress data which result from the computations described supra are then: the maximum absolute value of the stress at the top and bottom edge segments $\sigma_{max_{top}}$, $\sigma_{max_{bottom}}$; the maximum absolute value of the top and bottom quadratic curve $Q_{max_{top}}$ and $Q_{max_{bottom}}$; the maximum absolute value of the quadratic curves, $Q_{max}$, the average absolute value of the quadratic curve maximums, $Q_{ave}$, the amplitude range of the top and bottom difference curves, $A_{R_{top}}$, $A_{R_{bottom}}$, respectively; the first four amplitude components of the deconvolved top difference curve, $a_{1_{top}}$ through $a_{4_{top}}$; the first four amplitude components of the deconvolved bottom difference curve $a_{1_{bottom}}$ through $a_{4_{bottom}}$, and; the maximum absolute value of the stress distributions from the first and second side edges $\sigma_{max\ 1}$, $\sigma_{max\ 2}$.

The 18 variables determined during the preceding analysis are then correlated to an actual measured distortion of a sub-sheet cut from the parent glass sheet by pairing the 18 variables with 18 correlation coefficients and equating the 18 paired terms to the measured distortion. To obtain the measured distortion, the parent glass sheet which was previously measured for edge stress is cut into sub-sheets and a plurality of distortions are measured for each sub-sheet. For example, the maximum corner offset, as previously described, may be chosen. However, because distortion is a function of the pattern of cut (e.g. the size of the sub-sheets), if the predicted distortion of glass sheets formed from the glass forming apparatus used will ultimately be used by a purchaser (e.g. OEM), the sheet must be cut in accordance with the manner in which a particular OEM cuts the glass, and the distortion (e.g. offset) calculated in the manner the OEM calculates the distortion. This may in turn be dependent upon the use to which the OEM puts the glass. For example, many OEMs deposit components for multiple displays on a single sub-sheet, and therefore may choose to measure distortion as a function of offset relative to the corners of each display component area as arranged on the sub-sheet rather than the corners of the sub-sheet itself. In any event, once the parent glass sheet is cut, a plurality of distortion measurements are made comprising the offset between a point on the parent glass sheet before the cut, and on the same point on the respective sub-sheet after the cut and a least one of the sub-sheet distortion measurements (i.e. offsets) used determined a representative offset for the sub-sheet. This is done for each subsheet.

The representative distortion for each sub-sheet may be determined, for example, as the maximum measured distortion, or the representative distortion may be some other value derived from the measured distortions, such as the average of the measured distortions. In most cases, the maximum of the measured distortions for a given sub-sheet is chosen, as this worst-case choice provides greater protection for the manufacturer in meeting a distortion specification.

Once a representative distortion has been determined for each sub-sheet, a distortion representative of the collection of sub-sheets as a whole is determined and designated as the representative distortion $\delta_{meas}$ of the parent sheet. As in the case of each sub-sheet, the representative distortion for the collection of sub-sheets may be determined in a variety of ways. However, generally the distortion representative of the collection of sub-sheets (e.g. all of the sub-sheets cut from the parent glass sheet) is determined as the largest (maximum) of the representative distortions for each individual sub-sheet.

As suggested above, the equation resulting from the above analysis consists of 18 paired terms equated to $\delta_{meas}$ and expressed as:

$$\delta_{meas} = M_1 \cdot \sigma_{max_{top}} + M_2 \cdot \sigma_{max_{bottom}} + M_3 \cdot Q_{max_{top}} + \\ M_4 \cdot Q_{max_{bottom}} + M_5 \cdot Q_{max} + M_6 \cdot Q_{ave} + M_7 \cdot A_{R_{top}} + \\ M_8 \cdot A_{R_{bottom}} + M_9 \cdot a_{1_{top}} + M_{10} \cdot a_{2_{top}} + M_{11} \cdot a_{3_{top}} + \\ M_{12} \cdot a_{4_{top}} + M_{13} \cdot a_{1_{bottom}} + M_{14} \cdot a_{2_{bottom}} + M_{15} \cdot a_{3_{bottom}} + \\ M_{16} \cdot a_{4_{bottom}} + M_{17} \cdot \sigma_{max\ 1} + M_{18} \cdot \sigma_{max\ 2} \quad (2)$$

The correlation coefficients $M_1$ through $M_{18}$ are determined by conducting a conventional multivariate partial least squares regression. For the application described herein, a single response, distortion (μm), was used. PLS is particularly useful when the predictors are highly collinear (i.e. pair-wise correlated) or there are more predictors than observations. Since all predictors in the integrated model above represent different aspects of the same periphery stress data, the data are often somewhat correlated. Using ordinary least squares regression (OLS) would produce coefficients with high standard errors (i.e. high uncertainty around specific values for coefficients in model). PLS reduces the number of predictors to a set of uncorrelated components, and then performs least squares regression on these components. PLS differs conceptually from principal component regression (PCR) in that the components extracted are constructed with the response in mind; i.e. they are constructed to provide maximum correlation with the response. In the event that the predictors are uncorrelated, PLS often provides the same results as OLS in terms of the value of the coefficients.

Once developed, the 18 paired terms on the right side of equation (2) can be used to predict the amount of distortion sub-sheets of pre-determined size and shape will exhibit when cut from a given parent glass sheet. In this instance, the 18 paired terms are determined in accordance with the description based on the edge stress data for a given parent sheet of glass, and a value for maximum distortion calculated in place of the measured distortion value. That is, $\delta_{meas}$ is replaced with $\delta_{Pmax}$ in equation (2). In effect, one may then, for example, calculate and assign a maximum predicted distortion value to the parent glass sheet, effectively describing the maximum distortion which could be expected to be exhibited by a sub-sheet cut from the parent sheet.

As described, the definition of the distortion, i.e. how distortion is measured, may be determined by a particular OEM, or selected by the glass manufacturer. Glass sheet manufactured subsequent to the sheet of glass analyzed in accordance with the method described supra, and drawn from the same forming apparatus, may be measured for stress and the analysis in accordance with the present embodiment applied to determine a predicted distortion for subsequent parent glass sheets using the coefficients obtained during the previous analysis. The manufacturing process may then be modified in response to the predicted distortion. For example, the glass ribbon drawn from a fusion apparatus as described herein may be subjected to a pre-determined cooling scheme wherein the temperature of the glass ribbon (from which the parent glass sheet is cut) is varied as a function of the temperature (or viscosity) of the glass and/or the location across the width of the ribbon. In a fusion downdraw process, this is typically taken as a function of the distance from root 22 of the forming wedge 10. A particularly effective region for such temperature modifying intervention is between root 22 and pulling rolls 34, as this is typically the region wherein the glass undergoes a substantial portion of the transition from a viscous liquid to an elastic solid. It is therefore the region wherein much of the stress present in the finished parent glass sheet become frozen into the glass. Such approaches are discussed, for example, in U.S. patent application Ser. No. 11/233,565. However, control of the glass temperature may be effected on forming surfaces 18 and/or 20 of the forming wedge or below the pulling rolls as well.

In accordance with the present embodiment, the terms of equation (2) may be examined to determine the significant contributions to the magnitude of the predicted distortion. Thus, the glass making and forming processes may be modified to reduce the predicted distortion, if necessary, such as by varying the cooling and/or heating scheme of the glass ribbon as it is drawn. Other process variables which may be modified according to known methods in response to the predicted distortion include, but are not limited to, sheet draw or pulling rate, draw tension, and isopipe/glass temperature.

To ensure a more accurate prediction of distortion, the preceding stress analysis may be performed for a plurality of parent glass sheets over a given period of time in order to capture the effects of inevitable process variation. Thus, for example, one might perform the analysis in accordance with the present invention on multiple parent glass sheets on a daily basis over a period of several days or weeks. The results of these multiple measurements may then be combined, such as by averaging, to obtain a single representative prediction model (equation (2)).

While the preceding analysis has been described in terms of edge stress measurements, two-dimensional stress measurements may also be used wherein stress is measured not linearly along each edge segment, but across the width and length of the glass sheet, e.g. such as diagonally, from corner to diagonally opposed corner, or at a plurality of points within the central region of the sheet (i.e. inside of the sheet edges). However, a two-dimensional approach is less desirable for at least the following reasons: 1) A full sheet stress measurement is more time consuming than an edge stress measurement; 2) greater measurement capability is required for measuring internal stresses than edge stresses.

It should be obvious to one skilled in the art from the disclosure herein that the predicted distortion value may be used as a manufacturing control parameter in a manner as is known in the art. Thus, control limits are placed on the predicted distortion value and the glass sheet manufacturing process controlled within those limits. For example, the predicted maximum distortion may be controlled between the values of 0 and 6 μm (i.e. 0 μm$\leq \delta_{Pmax} \leq$6 μm). Since the stress data used in equation (2) are absolute values and therefore positive, the predicted distortion value is positive, and therefore the range 0 to 6 μm is the same as saying $\leq$6 μm. Alternatively, a suitable target distortion might be a nominal distortion with a given variation, e.g. 2 μm±1 μm. Predicted distortion values, when weighed against the manufacturing limit, may then be used in a feedback mechanism for controlling the glass sheet manufacturing process as described supra.

The predicted distortion value may further be used as a product specification in the trade and commerce of glass sheet between OEMs and glass manufacturers. In this instance, the predicted maximum distortion for a given parent glass sheet is compared to a pre-determined value of maximum distortion as a pass/fail criteria against the sheet. For example, the pre-determined pass/fail criteria may be set at $\delta_{Pmax} \leq$2 μm. Statistical sampling methods as are known in the art may be applied such that the population of glass sheets may be sampled rather than each individual glass sheet measured for stress to determine performance against the pass/fail limit.

It should also be obvious to one skilled in the art from the disclosure herein that the model residual (actual minus the predicted value) can be used to evaluate model performance in a manner as is known in the art. Thus, control limits are placed on the residual value about a zero centerline. Model performance is satisfied if the plotted residuals are kept within the control limits and no non-random patterns are detected over time.

Although the foregoing description has been presented in the context of a fusion downdraw method for making glass sheet, the present invention may be applied to other glass sheet forming processes, including but not limited to updraw and float methods.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method of minimizing distortion in a glass sheet comprising:

forming a glass ribbon in a glass manufacturing process;

separating a glass sheet from the glass ribbon, the glass sheet having a top edge, a bottom edge and two side edges intersecting the top and bottom edges;

measuring stress along each edge of glass sheet to produce stress data for each edge and identifying an maximum absolute value of stress for each edge;

fitting curves to the stress data for the top and bottom edges;

subtracting the fitted curves, respectively, from the stress data for the top and bottom edges to produce a difference curve for the top and bottom edges, and identifying the maximum absolute values of the top and bottom edge difference curves;

obtaining the absolute value of the amplitude range of the top and bottom edge difference curves;

deconvolving the top and bottom difference curves to obtain a plurality of Fourier amplitude terms for the top and bottom edge difference curves;

cutting the glass sheet into sub-sheets, flattening each sub-sheet and measuring an in-plane distortion for each sub-sheet;

using the maximum absolute value of stress for each edge, the maximum absolute values of the top and bottom edge difference curves, the absolute value of the amplitude range of the top and bottom edge difference curves and the plurality of Fourier amplitude terms to correlate the stress in the glass sheet to the in-plane distortion of the sub-sheets;

using the correlation to predict in-plane distortion in sub-sheets of a subsequent glass sheet separated from the ribbon.

2. The method according to claim 1, further comprising modifying the glass manufacturing process in response to the predicted in-plane distortion.

3. The method according to claim 1, wherein determining in-plane distortion for each sub-sheet comprises measuring an offset between fiduciary marks marked on each flattened sub-sheet and fiduciary marks on a planar support supporting each flattened sub-sheet.

4. The method according to claim 1, wherein measuring stress in the glass sheet comprises measuring stress in a central portion of the glass sheet.

* * * * *

UNITED STATES PATENT AND TRADEMARK OFFICE
CERTIFICATE OF CORRECTION

| | |
|---|---|
| PATENT NO. | : 7,685,840 B2 |
| APPLICATION NO. | : 11/389615 |
| DATED | : March 30, 2010 |
| INVENTOR(S) | : Roger Alphee Allaire et al. |

Page 1 of 1

It is certified that error appears in the above-identified patent and that said Letters Patent is hereby corrected as shown below:

| No. | Col. | Line | Description |
|---|---|---|---|
| 1 | 12 | 22 | After "of", please add the word "the" |

Signed and Sealed this

Tenth Day of August, 2010

David J. Kappos
*Director of the United States Patent and Trademark Office*